March 7, 1939.  R. TINKER  2,150,011

POWER STEERING MECHANISM

Filed Aug. 12, 1937  2 Sheets-Sheet 1

WITNESSES

INVENTOR
Ralph Tinker
BY
ATTORNEYS

March 7, 1939.　　　　R. TINKER　　　　2,150,011
POWER STEERING MECHANISM
Filed Aug. 12, 1937　　　2 Sheets-Sheet 2

WITNESSES

INVENTOR
Ralph Tinker
BY
ATTORNEYS

Patented Mar. 7, 1939

2,150,011

UNITED STATES PATENT OFFICE 2,150,011

POWER STEERING MECHANISM

Ralph Tinker, Fountain City, Wis.

Application August 12, 1937, Serial No. 158,698

4 Claims. (Cl. 180—79.4)

This invention relates to power steering mechanism and more particularly to steering means for tractors and other power vehicles, an object of the invention being to provide improved means for moving a pair of pivotally connected frames supported respectively by wheels to steer the vehicle.

My improved vehicle includes a pair of frames connected by a pivot or axis arranged so that a lateral movement of the outer ends of the frames to the right or left may be obtained which causes a variable angular disposition of the wheels for steering.

The invention embodies many novel features of construction and combinations and arrangements of parts, all of which will be more fully hereinafter described and pointed out in the claims.

In the accompanying drawings—

Figure 1:
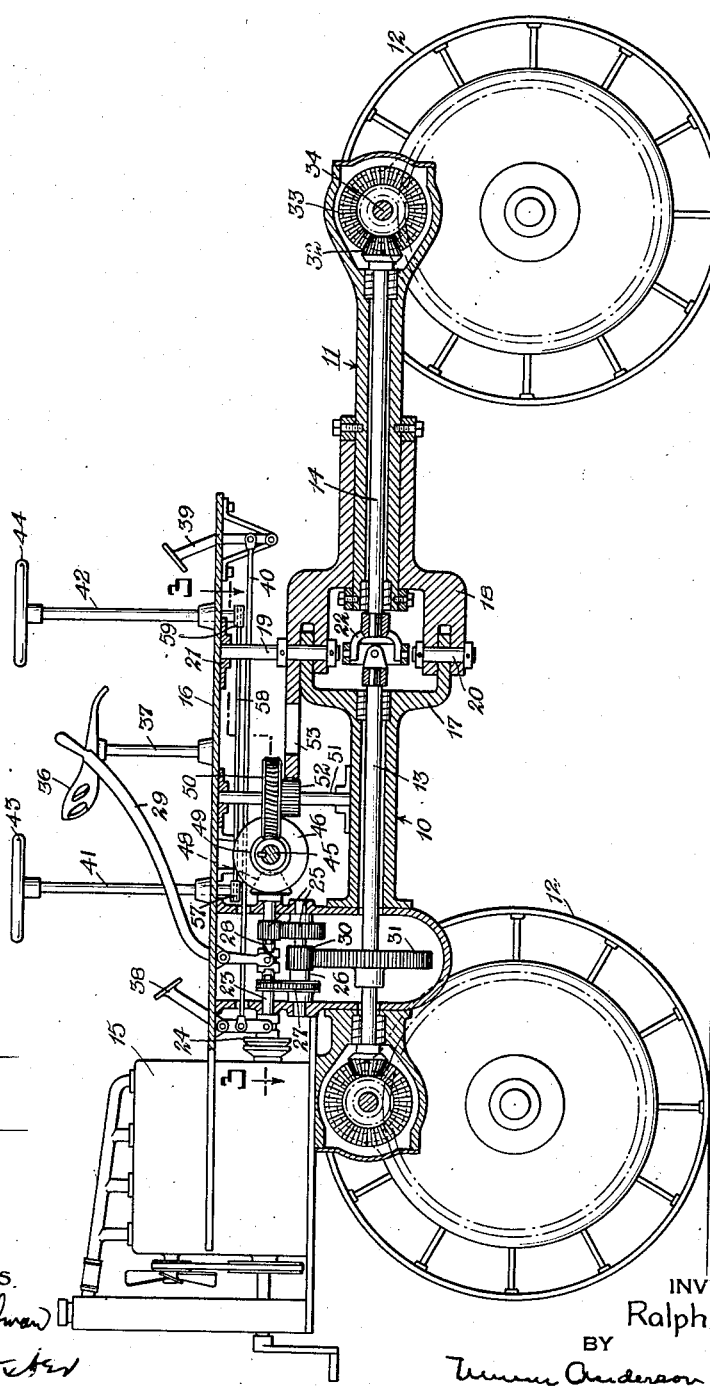
Fig. 1 is a view in longitudinal section through a tractor illustrating my invention.

My improved vehicle comprises two frames 10 and 11 normally in alignment, and while it is, of course, to be understood that the vehicle may be moving in either direction, I shall for convenience refer to the frame 10 as the front frame and to the frame 11 as the rear frame. These frames 10 and 11, at their outer ends, are supported by pairs of wheels 12 and each frame 10 and 11 is provided with a longitudinal shaft indicated by the reference characters 13 and 14, respectively. The front frame 10 supports an engine or motor 15 and an operator's platform 16. The frames 10 and 11, at their inner ends, are provided with yokes 17 and 18 respectively, and these yokes are pivotally connected by a pair of vertically aligned pins 19 and 20, the upper pin 19 being located in a bearing 21 on the bottom of the operator's platform 16 and constituting in effect a king pin. The shafts 13 and 14 above referred to are operatively connected by a universal coupling 22, which is housed in the yokes 17 and 18 and located in vertical alignment with the pivot pins 19 and 20.

Figure 2:
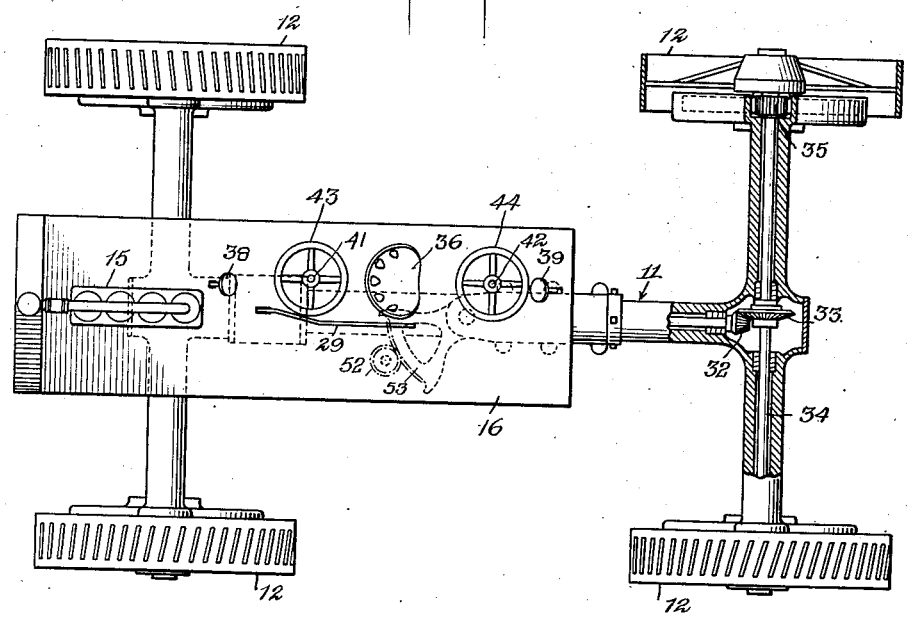
Fig. 2 is a view mainly in plan but partly in section.

23 represents a shaft which is driven by the engine and coupled thereto by a clutch 24. This shaft 23 is connected by intermeshing gears 25 with a countershaft 26 and also is connected by a chain drive 27 with the countershaft 26. 28 represents a clutch which is manually moved by a lever 29 on the platform 16 to cause either the gear drive 25 or the chain drive 27 to be operatively connected to the shaft 23, thus permitting the countershaft 26 to be driven in either direction in accordance with the position of the clutch 28. The countershaft 26 is provided with a pinion 30 meshing with a gear wheel 31 on the shaft 13 so that through the medium of the mechanism above described motion is imparted to the shafts 13 and 14. These shafts 13 and 14 drive the four wheels 12, and as indicated at the right-hand portion of Fig. 2 these shafts 13 and 14 may be provided at their outer ends with pinions 32 meshing with bevel gears 33 on transversely extending shafts 34. These shafts 34, at their ends, carry pinions 35 to impart rotary motion to the wheels 12.

An operator's seat 36 has rotary mounting on a post 37 secured to platform 16 so that the seat may turn and permit the operator to face in either direction.

The clutch 24 above referred to is operated directly by a foot pedal 38 pivoted to platform 16, and a second foot pedal 39 located at the other end of the platform is operatively connected to the pedal 38 by a link 40, so that through the operation of either of the pedals 38 and 39, the clutch 24 may be controlled. The platform 16 provides rotary mounting for a pair of steering posts 41 and 42, respectively, provided at their upper ends with steering wheels 43 and 44, respectively.

Figure 3:
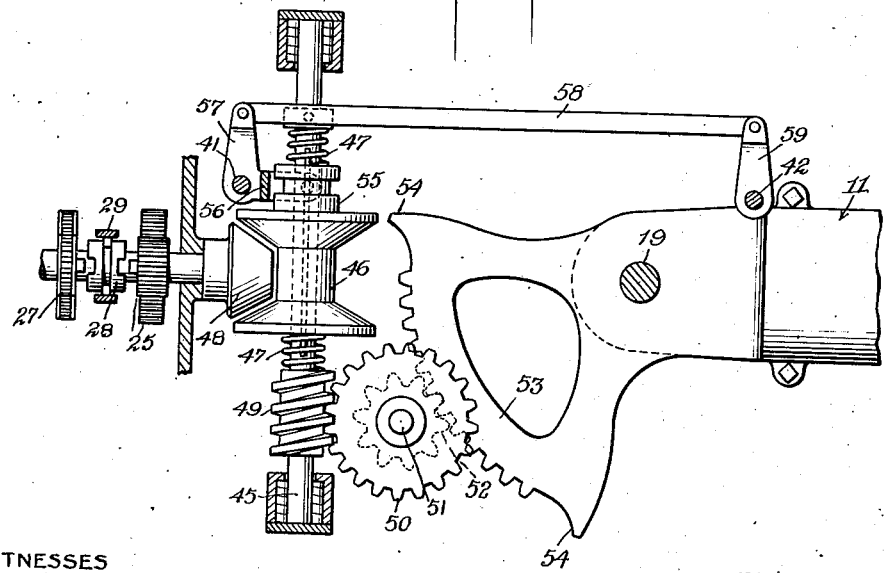
Fig. 3 is an enlarged fragmentary detail view illustrating the transmission mechanism to control the steering of the vehicle.

45 represents a transversely positioned shaft supported by the front frame 10, and on this shaft 45 a friction spool 46 is keyed to slide and held in its normal or neutral position by a pair of coiled springs 47. This friction spool 46 constitutes a pair of facing spaced bevel friction gears, which are adapted to be frictionally engaged by a bevel friction gear 48 secured on the end of the shaft 23 but normally in neutral position spaced from either end of the friction spool, as shown in Fig. 3 of the drawings. The shaft 45 is provided with a worm 49, which meshes with a worm wheel 50 secured on a vertical shaft 51 carried by frame 10. A pinion 52 is fixed to turn with the worm wheel 50 and shaft 51 and meshes with a toothed segment 53 which constitutes an extension of the upper portion of the yoke 18 of frame 11. This segment 50 is provided with extensions or projections 54 at its ends which prevent the segment from riding entirely out of its engagement with the pinion.

The friction spool 46, at one end, is provided with a grooved hub 55 which is engaged by a forked arm 56 fixed to steering post 41 so that when this steering post is turned it will cause the friction spool 46 to move longitudinally on the shaft 45 and frictionally engage the friction gear 48 to cause motion to be transmitted to steer the vehicle either to the right or left through the medium of the power of the engine or motor. This forked arm 56 constitutes, as a matter of fact, a member of a bell crank lever which includes a second arm 57 which is connected by a link 58 with a crank arm 59 on steering post 42 so that either of the steering posts may be operated to shift the friction spool.

It is apparent from the above description that when the friction spool 46 is shifted to one position the shaft 45 will be driven in one direction to impart motion to the worm 49, worm wheel 50, shaft 51, and pinion 52 to swing the segment 53 in one direction and correspondingly cause the frames 10 and 11 to assume an angular disposition relative to each other. When the spool 46 is shifted to another position the motion will be transmitted in the opposite direction so that the vehicle may be easily and quickly steered under the absolute control of the operator.

While I have illustrated and described what I believe to be a preferred embodiment of my invention, it is obvious that various changes may be made with regard to the form and arrangement of parts without departing from my invention, and hence I do not limit myself to the precise details set forth but consider myself at liberty to make such changes and alterations as fairly fall within the spirit and scope of the claims.

I claim:

1. A steering mechanism including a pair of wheel-supported frames, means for pivotally connecting said frames, a toothed segment fixed to one of the frames, a pinion engaging the segment, a power driven shaft on one of said frames, friction means operatively connecting said shaft and the pinion, said friction means including a longitudinally movable friction spool, a friction gear on the power driven shaft adapted to engage either end of said spool when the latter is moved longitudinally, a worm driven by said spool, and a worm wheel engaging the worm and operatively connected to the pinion, and hand actuated means for shifting said spool from one position to another.

2. A power steering mechanism including a pair of wheel supported frames, said frames at their inner ends pivotally connected, a transverse shaft supported by one of the frames, a friction spool keyed to slide on said shaft, a power driven friction pulley adapted to frictionally engage either end of said spool, a pair of steering posts on the frame, means operatively connecting both of said steering posts to the friction spool to move the same longitudinally of its shaft, a segment fixed to a frame, and power transmitting means between the segment and the transverse shaft.

3. A power steering mechanism including a pair of wheel supported frames, said frames at their inner ends pivotally connected, a transverse shaft supported by one of the frames, a friction spool keyed to slide on said shaft, a power driven friction pulley adapted to frictionally engage either end of said spool, a pair of steering posts on the frame, means operatively connecting both of said steering posts to the friction spool to move the same longitudinally of its shaft, a segment fixed to a frame, a worm gear on the transverse shaft, a worm wheel driven by said worm gear, and a pinion operatively connected to turn with the worm wheel and meshing with the segment.

4. A power steering mechanism including a pair of wheel supported frames, said frames at their inner ends pivotally connected, a transverse shaft supported by one of the frames, a friction spool keyed to slide on said shaft, a power driven friction pulley adapted to frictionally engage either end of said spool, a pair of steering posts on the frame, means operatively connecting both of said steering posts to the friction spool to move the same longitudinally of its shaft, a segment fixed to a frame, a worm gear on the transverse shaft, a worm wheel driven by said worm gear, a pinion operatively connected to turn with the worm wheel and meshing with the segment, and springs on the transverse shaft at opposite sides of the friction spool holding the same in normal neutral position.

RALPH TINKER.